(12) United States Patent
Tamekuni et al.

(10) Patent No.: US 8,985,876 B2
(45) Date of Patent: Mar. 24, 2015

(54) FERRULE HOLDER

(75) Inventors: Yoshikyo Tamekuni, Chigasaki (JP); Yuji Suzuki, Chigasaki (JP); Yukihiro Yokomachi, Yokohama (JP)

(73) Assignees: SEI Optifrontier Co., Ltd., Yokohama-shi, Kanagawa (JP); Sumitomo Electric Industries, Ltd., Osaka-shi, Osaka (JP)

( * ) Notice: Subject to any disclaimer, the term of this patent is extended or adjusted under 35 U.S.C. 154(b) by 264 days.

(21) Appl. No.: 13/504,187

(22) PCT Filed: Oct. 27, 2010

(86) PCT No.: PCT/JP2010/069060
§ 371 (c)(1),
(2), (4) Date: Jun. 13, 2012

(87) PCT Pub. No.: WO2011/052633
PCT Pub. Date: May 5, 2011

(65) Prior Publication Data
US 2012/0243839 A1     Sep. 27, 2012

(30) Foreign Application Priority Data
Oct. 28, 2009    (JP) .................................. 2009-248032

(51) Int. Cl.
*G02B 6/255*    (2006.01)
*G02B 6/00*     (2006.01)

(52) U.S. Cl.
CPC .................................... *G02B 6/2555* (2013.01)
USPC ................................ 385/97; 385/96; 385/136

(58) Field of Classification Search
USPC ............................. 385/97, 60, 72, 78, 136, 137
See application file for complete search history.

(56) References Cited

U.S. PATENT DOCUMENTS

| 582,861 | A | | 5/1897 | Henry et al. |
| 4,750,804 | A | | 6/1988 | Osaka et al. |
| 5,098,207 | A | * | 3/1992 | Blomgren ........................ 385/16 |
| 5,675,124 | A | * | 10/1997 | Stough et al. ................. 174/656 |

(Continued)

FOREIGN PATENT DOCUMENTS

| CN | 201199271 Y | 2/2009 |
| JP | 62-79209 | 5/1987 |
| JP | 5-55105 | 7/1993 |

(Continued)

*Primary Examiner* — Ryan Lepisto
*Assistant Examiner* — Robert Tavlykaev
(74) *Attorney, Agent, or Firm* — Drinker Biddle & Reath LLP

(57) ABSTRACT

A ferrule holder is provided as one capable of improving convenience in a fusion splice between a built-in fiber and an optical fiber. The ferrule holder 1 is provided with a main body 2 and a lid 3. The main body 2 has a mount portion 4 on which a ferrule body is to be mounted, and the mount portion 4 is provided with a first mount surface 8, and a second mount surface 9 provided through a step portion 11 on the rear side of the first mount surface 8. This allows, for example, the ferrule body with a dust cap thereon to be mounted on the first mount surface 8 in the fusion splice in the case of an SC connector; it also allows the ferrule body with a dust cap thereon to be mounted on the second mount surface 9 in the fusion splice in the case of an LC connector. Therefore, there is no need for preparing a plurality of ferrule holders according to types of connectors, which can achieve improvement in convenience in the fusion splice between the built-in fiber and the optical fiber.

5 Claims, 9 Drawing Sheets

(56) References Cited

U.S. PATENT DOCUMENTS 6,722,929 B2 * 4/2004 Vincent et al. ............... 439/801
7,934,874 B2    5/2011 Honma et al.

FOREIGN PATENT DOCUMENTS

| | | |
|---|---|---|
| JP | 9-90167 | 4/1997 |
| JP | 10-31133 | 2/1998 |
| JP | 2003-66265 | 3/2003 |
| JP | 2007-286599 | 11/2007 |
| JP | 2008-181004 | 8/2008 |
| JP | 4270521 | 6/2009 |
| JP | 2009-163004 | 7/2009 |
| JP | 2009-169020 | 7/2009 |

* cited by examiner

Fig.4
(a) 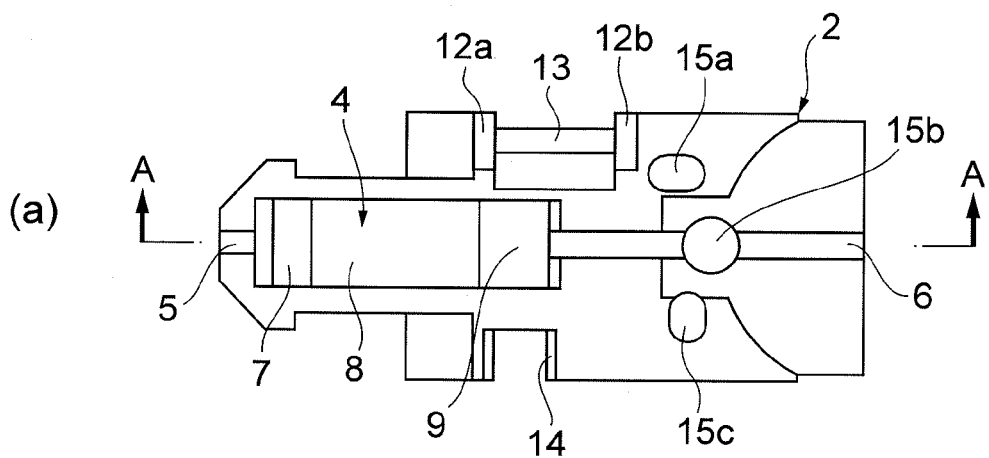
(b) 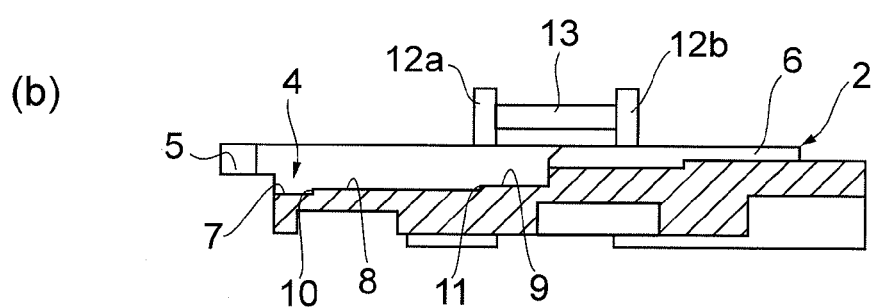

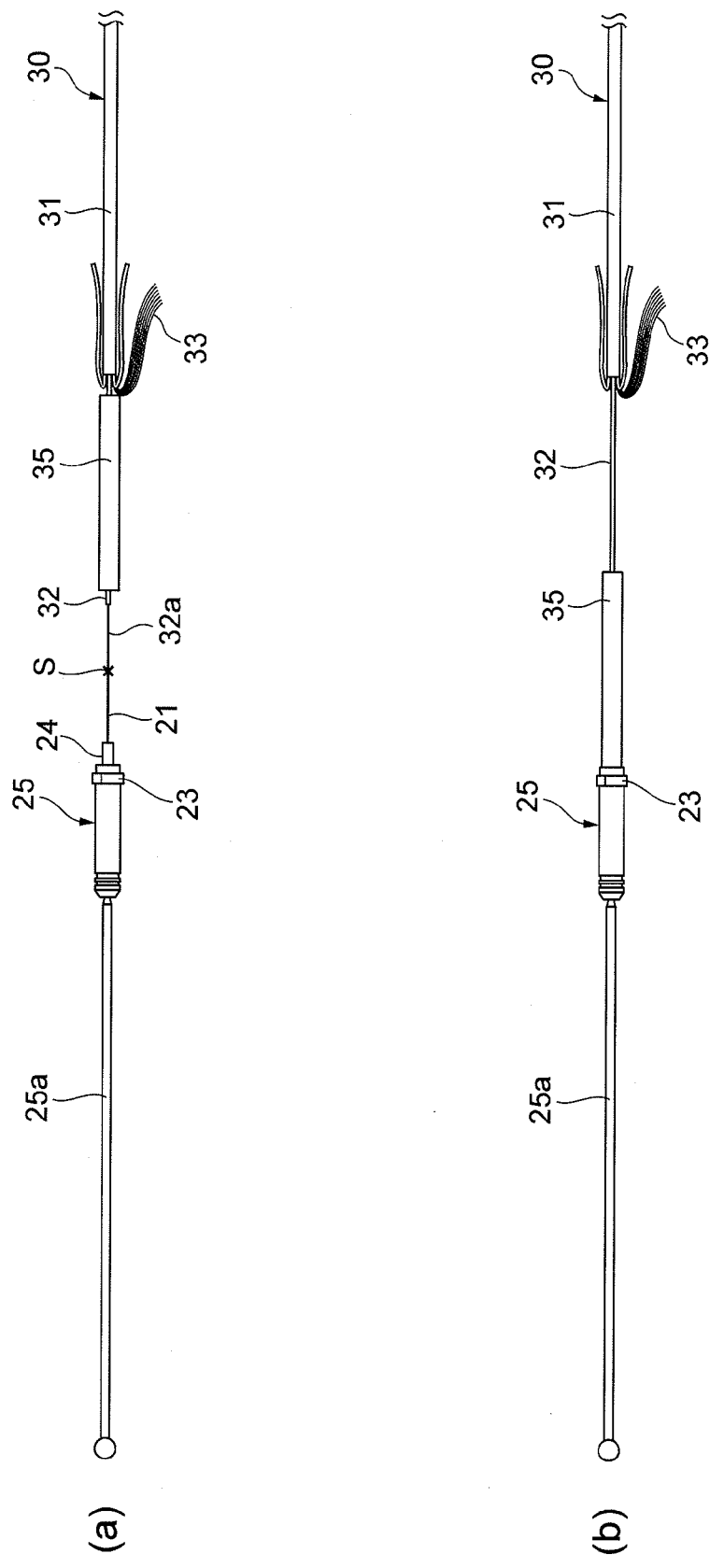

FERRULE HOLDER

TECHNICAL FIELD

The present invention relates to a ferrule holder.

BACKGROUND ART

An assembling operation of an optical connector sometimes involves a fusion splice between a built-in fiber of a ferrule member and an optical fiber of an optical cord by means of a fusion splicer. In the fusion splice a tip of the built-in fiber and a tip of the optical fiber need to be arranged opposite to each other and, because the ferrule has the very small diameter, e.g., about 2 mm, it is difficult to handle it with bare hands. Therefore, a ferrule holder for holding the ferrule member is used in execution of the fusion splice between the built-in fiber and the optical fiber (e.g., cf. Patent Literature 1)

CITATION LIST

Patent Literature

Patent Literature 1: Japanese Patent Application Laid-open No. 2007-286599

SUMMARY OF INVENTION

Technical Problem

Incidentally, a ferrule body holding the built-in fiber in the ferrule member has the length and outside diameter different depending upon a type of connector. Specifically, for example, the outside diameter of the ferrule body is 2.5 mm in the case of an SC connector and the outside diameter of the ferrule body is 1.25 mm in the case of an LC connector. For this reason, there was a need for preparing ferrule holders corresponding to the respective connectors, in order to implement the fusion splice between the built-in fiber and the optical fiber.

The present invention has been accomplished in order to solve the above problem and it is an object of the present invention to provide a ferrule holder achieving improvement in convenience in the fusion splice between the built-in fiber and the optical fiber.

Solution to Problem

In order to solve the above problem, a ferrule holder to be mounted on a fusion splicer while holding a ferrule member, in execution of a fusion splice between a built-in fiber held by a ferrule body in the ferrule member and an optical fiber of an optical cord, the ferrule holder comprising: a main body configured to house the ferrule body and a flange portion fixed to the ferrule body, and having a mount portion on which the ferrule body is to be mounted; and a lid arranged so as to be freely opened and closed with respect to the main body and configured to hold the ferrule body between the lid and the main body, wherein the mount portion has a first mount surface, and a second mount surface provided on the rear side of the first mount surface, wherein between the first mount surface and the second mount surface there is a step portion provided so as to make the second mount surface higher than the first mount surface.

This ferrule holder has the first mount surface, and second mount surface provided through the step portion on the rear side of the first mount surface, in the mount portion on which the ferrule body is to be mounted. For example, the ferrule body of the SC connector is larger in outside diameter than the LC connector, while the ferrule body of the LC connector is smaller in outside diameter than the ferrule body of the SC connector. When a cap for protecting the ferrule body from dirt and dust is put thereon during the fusion splice, for example, the cap on the ferrule body of the LC connector is larger in length than the cap on the ferrule body of the SC connector. Then, for example, the ferrule body is mounted on the first mount surface in the fusion splice in the case of the SC connector, and the ferrule body is mounted on the second mount surface in the fusion splice in the case of the LC connector. This allows one ferrule holder to adapt to various connectors. Therefore, there is no need for preparing a plurality of ferrule holders according to types of connectors, which can achieve improvement in convenience in the fusion splice between the built-in fiber and the optical fiber.

Preferably, the ferrule member has a tubular portion fixed to the flange portion so as to hold the built-in fiber on the rear side of the ferrule body, and the main body is provided with a first groove for the tubular portion to be mounted therein, on the front side of the first mount surface. This allows us to readily perform positioning of the tubular portion and thus allows us to easily set the ferrule member on the ferrule holder.

Preferably, the ferrule body is covered by a cap which covers the entire ferrule body and to a tip of which a string is coupled, and the main body is provided with a second groove for the string to be mounted therein, on the rear side of the second mount surface. In this configuration, the string is housed and held in the first groove, whereby the string is prevented from being a hindrance during execution of the fusion splice.

Preferably, fixing means for fixing the main body to the fusion splicer is provided on a back surface of the main body. In this case, since the main body is fixed to the fusion splicer, for example, by means of magnets or the like, the ferrule holder is prevented from deviating during the fusion splice.

Advantageous Effect of Invention

The present invention improves convenience in the fusion splice between the built-in fiber and the optical fiber.

BRIEF DESCRIPTION OF DRAWINGS

FIG. 4 (*a*) is a top plan view of a main body and FIG. 4 (*b*) a cross-sectional view along the line A-A in (a).

FIG. 9 is a drawing for explaining the procedure of the fusion splice between the built-in fiber and the bare fiber of the coated optical fiber.

DESCRIPTION OF EMBODIMENTS

A preferred embodiment of the fiber holder according to the present invention will be described below in detail with reference to the drawings.

Figure 1:
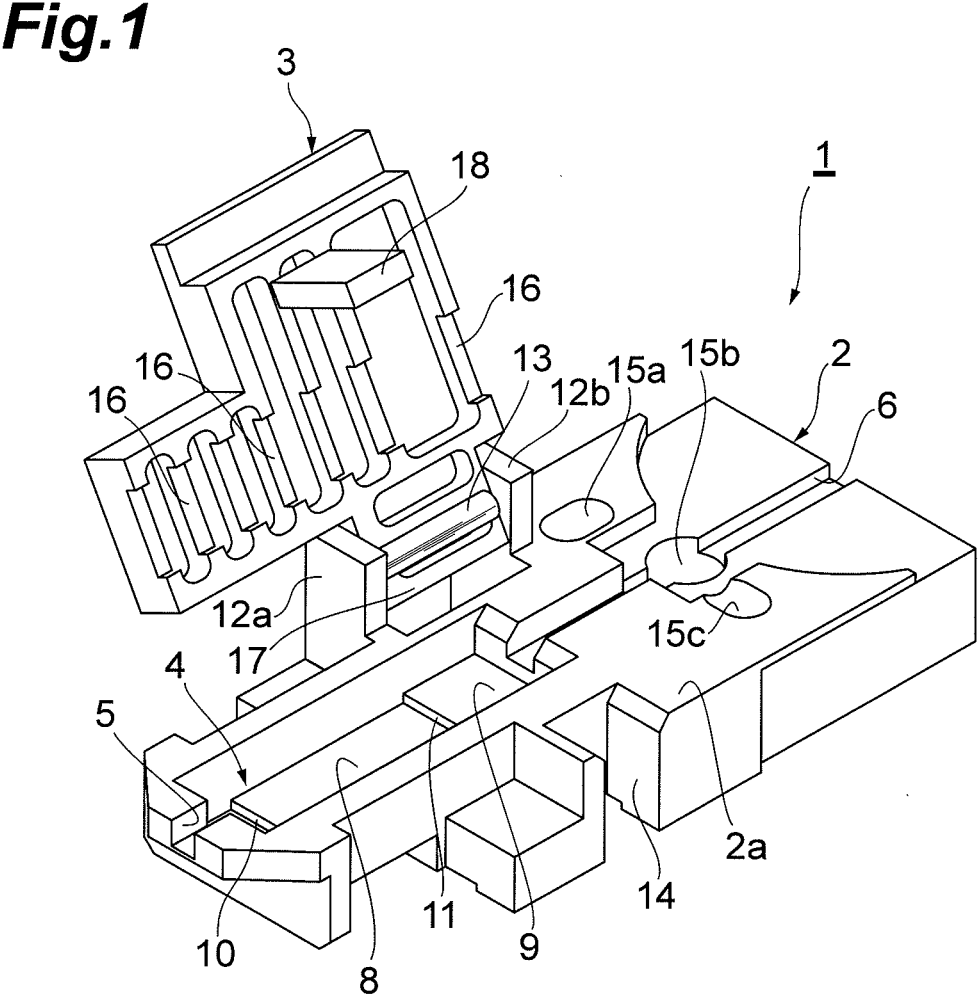
FIG. 1 is a perspective view showing a ferrule holder according to an embodiment of the present invention.

FIG. 1 is a perspective view showing the ferrule holder according to an embodiment of the present invention. As shown in the same drawing, the ferrule holder 1 is a member that is to be mounted on a fusion splicer while holding a ferrule member 20, in a fusion splice between a bare fiber 32a of a coated optical fiber 32 in an optical cord 30 (cf. FIG. 8 for all of them) and a built-in fiber (optical fiber) 21 of a ferrule member 20 (cf. FIG. 2).

Figure 2:
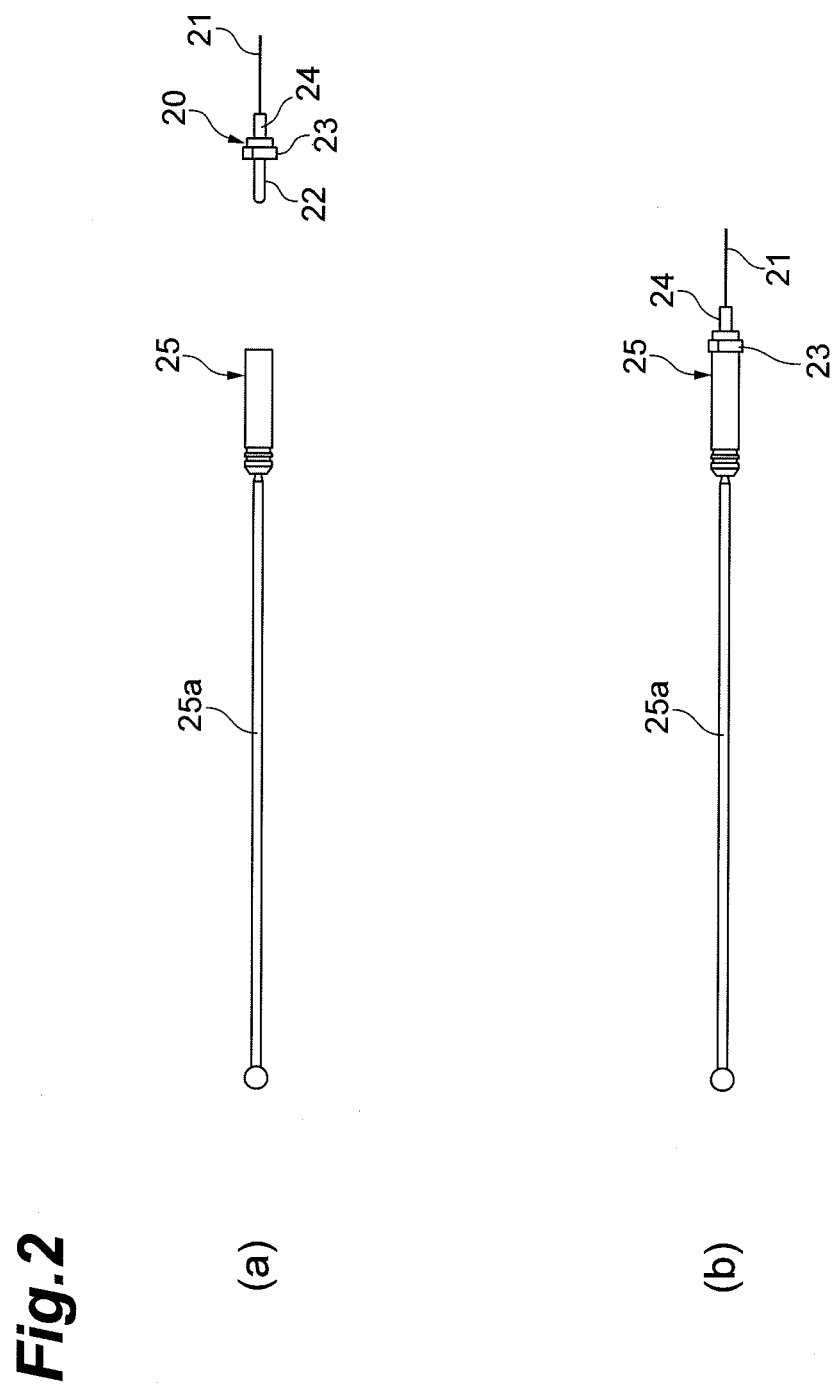
FIG. 2 is a drawing showing a ferrule member to be mounted on a ferrule holder.

The ferrule member 20 will be described below. FIG. 2 is a drawing showing the ferrule member 20 to be mounted on the ferrule holder. The ferrule member 20 shown in FIG. 2 (a) is, for example, one used in the SC connector, and has a ferrule body 22 holding the built-in fiber 21 of a short length, a flange portion 23 fixed to the ferrule body 22, and a tubular portion 24 fixed to a rear end face of the flange portion 23 so as to hold the built-in fiber 21 on the rear side of the ferrule body 22.

The built-in fiber 21 projects backward by a predetermined length from the ferrule member 20. The flange portion 23 has an approximately rectangular shape. In the fusion splice between the built-in fiber 21 and the bare fiber 32a of the coated optical fiber 32, as shown in FIG. 2 (b), a dust cap 25 for protecting the ferrule body 22 from dirt, dust, and so on is put on the ferrule body 22. The dust cap 25 has an approximately cylindrical shape. A string 25a is attached to the tip of the dust cap 25. The ferrule member 20 is mounted on the ferrule holder 1 in the state shown in FIG. 2 (b), i.e., in a state in which the dust cap 25 is put on the ferrule body 22.

Figure 3:
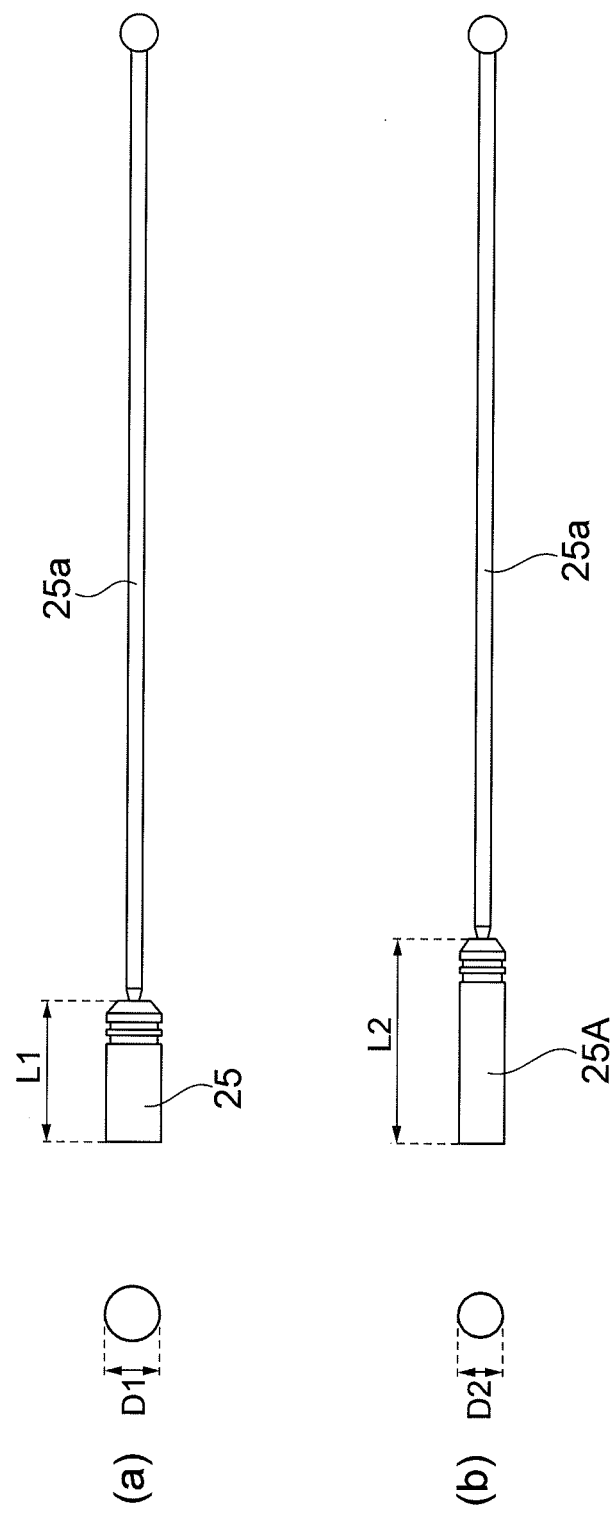
FIG. 3 is a drawing showing dust caps.

The ferrule body 22 has the shape that differs depending upon a type of optical connector, and the dust cap 25 also has the shape that differs according to the ferrule body 22. Specifically, for example, in the case of the aforementioned SC connector, as shown in FIG. 3 (a), the dust cap 25 has the outside diameter D1 so as to fit the ferrule body 22 with the outside diameter of 2.5 mm. On the other hand, in the case of the LC connector, as shown in FIG. 3 (b), the dust cap 25A has the outside diameter D2 (D1>D2) so as to fit the ferrule body 22A (cf. FIG. 7) with the outside diameter of 1.25 mm. The ferrule body 22 of the connector has the length larger than that of the ferrule body 22A of the LC connector, but the length L1 of the dust cap 25 for the SC connector is, for example, about 4 mm smaller than the length L2 of the dust cap 25A for the LC connector (L1<L2).

Referring back to FIG. 1, the ferrule holder 1 has a main body 2 and a lid 3.

The main body 2 is a portion that is configured to house the ferrule body 22 and the flange portion 23 with the dust cap 25 thereon. FIG. 4 (a) is a top plan view of the main body and FIG. 4 (b) a cross-sectional view along the line A-A in FIG. 4 (a). As shown in each drawing, the main body 2 is provided with a mount portion 4, a first groove 5, and a second groove 6.

The mount portion 4 is a portion on which the ferrule body 22 and the flange portion 23 are to be mounted. The mount portion 4 has a housing space of a rectangular shape and is provided with a flange mount surface 7, a first mount surface 8, and a second mount surface 9.

The flange mount surface 7 is a portion on which the flange portion 23 of the ferrule member 20 is to be mounted, and is provided on the front end side of the mount portion 4. This flange mount surface 7 is located at a position lower than the first mount surface 8 and the second mount surface 9, in the mount portion 4. The length of the flange mount surface 7 is determined corresponding to the thickness of the flange portion 23 (cf. FIG. 7) and is smaller than the lengths of the first mount surface 8 and the second mount surface 9 in the mount portion 4.

The first mount surface 8 is a portion on which the ferrule body 22 with the dust cap 25 (cf. FIG. 3 (a)) thereon is to be mounted. Namely, the first mount surface 8 is a portion on which the ferrule body 22 of the SC connector is to be mounted. This first mount surface 8 is provided between the flange mount surface 7 and the second mount surface 9. Between the first mount surface 8 and the flange mount surface 7, there is a first step portion 10 provided so as to make the first mount surface 8 higher than the flange mount surface 7. This first step portion 10 is arranged approximately perpendicularly to the flange mount surface 7 and the first mount surface 8. The first mount surface 8 has the length larger than those of the flange mount surface 7 and the second mount surface 9, and the length of the first mount surface 8 is equal to the length L1 of the dust cap 25.

The second mount surface 9 is a portion on which the ferrule body 22A with the dust cap 25A (cf. FIG. 3 (b)) thereon is to be mounted. Namely, the second mount surface 9 is a portion on which the ferrule body 22A of the LC connector is to be mounted. The second mount surface 9 is provided behind the first mount surface 8 on the rear end side of the mount portion 4. Between the second mount surface 9 and the first mount surface 8, there is a second step portion 11 provided so as to make the second mount surface 9 higher than the first mount surface 8. This second step portion 11 is arranged approximately perpendicularly to the first mount surface 8 and the second mount surface 9 and has the height of about 0.35 mm. The second mount surface 9 is a surface higher than the flange mount surface 7 and the first mount surface 8, in the mount portion 4. The second mount surface 9 has the length smaller than that of the first mount surface 8 and equal to a difference between the lengths of the dust cap 25 and the dust cap 25A (L2−L1≈4 mm).

The first groove 5 is a portion in which the tubular portion 24 of the ferrule member 20 is to be mounted. This first groove 5 has a rectangular cross section and is provided along the longitudinal direction on the front end side of the main body 2. The first groove 5 is a groove for positioning the tubular portion 24 on the occasion of mounting the ferrule member 20, and is provided for common use to various connectors.

The second groove 6 is a portion in which the string 25a of the dust cap 25 is to be mounted. This second groove 6 has a rectangular cross section and is provided along the longitudinal direction on the rear side of the main body 2 (behind the second mount surface 9). The second groove 6 is a groove for housing the string 25a of the dust cap 25 and is provided for common use to various connectors.

As shown in FIG. 4 (a), a pair of projections 12a, 12b projecting upward from a top surface 2a of the main body 2 are provided on one lateral side in the width direction of the main body 2. A hinge pin 13 of a rod shape is hung between the projections 12a, 12b. This hinge pin 13 is engaged with a below-described hinge 17 of the lid 3.

On the other hand, a recess 14 is provided on the other lateral side of the main body 2. This recess 14 is provided along the height direction of the main body 2 and a below-described projection 18 of the lid 3 is to be fitted therein.

The main body 2 is provided with a plurality of (three herein) through holes 15a-15c. The through holes 15a-15c are holes in which positioning pins of an unillustrated fusion splicer are to be inserted. When the positioning pins are inserted in the through holes 15a-15c, the ferrule holder 1 is positioned at the mount position in the fusion splicer.

Figure 5:
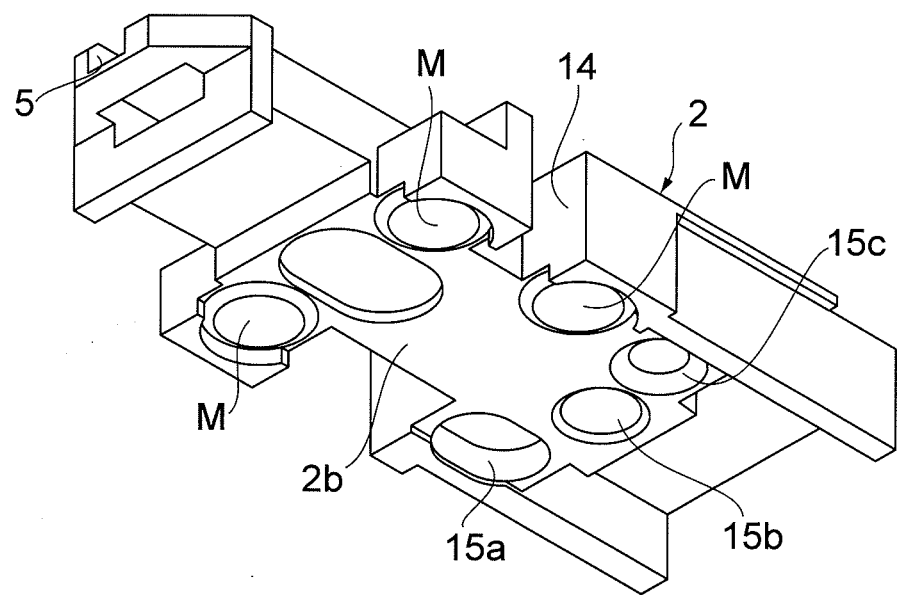
FIG. 5 is a perspective view from the bottom of the ferrule holder.

As shown in FIG. 5, there are a plurality of (three herein) magnets (fixing means) M provided on a bottom surface (back surface) 2b of the main body 2. This allows the ferrule holder 1 to be fixed to the fusion splicer, when mounted thereon. Since the plurality of magnets M are provided, the ferrule holder is adaptable to various fusion splicers.

Referring back to FIG. 1, the lid 3 is a part that is configured to hold the ferrule member 20 (dust cap 25) between the lid 3 and the main body 2. The lid 3 is formed in an L-shape and has the length corresponding to the ferrule body 22 (dust cap 25). This lid 3 has contact portions 16, the hinge 17, and the projection 18.

There are a plurality of (seven herein) contact portions 16 in the longitudinal direction of the lid 3 and they are portions to be brought into contact with the dust cap 25 in a closed state of the lid 3. The contact portions 16 push the dust cap 25 when the lid 3 is closed. This causes the lid 3 to hold the ferrule member 20 between the lid 3 and the main body 2.

The hinge 17 is provided at one end in the width direction of the lid 3. The hinge 17 has a cross-sectional shape corresponding to the hinge pin 13 of the main body 2 and is engaged with the hinge pin 13. This makes the lid 3 arranged so as to be freely opened and closed with respect to the main body 2.

The projection 18 is provided at the other end of the lid 3. The projection 18 is a columnar member and projects downward from the lid 3. The projection 18 is fitted in the recess 14 of the main body 2 in the closed state of the lid 3. This makes the lid 3 maintained in the closed state so as to prevent deviation of the ferrule member 20.

Figure 6:
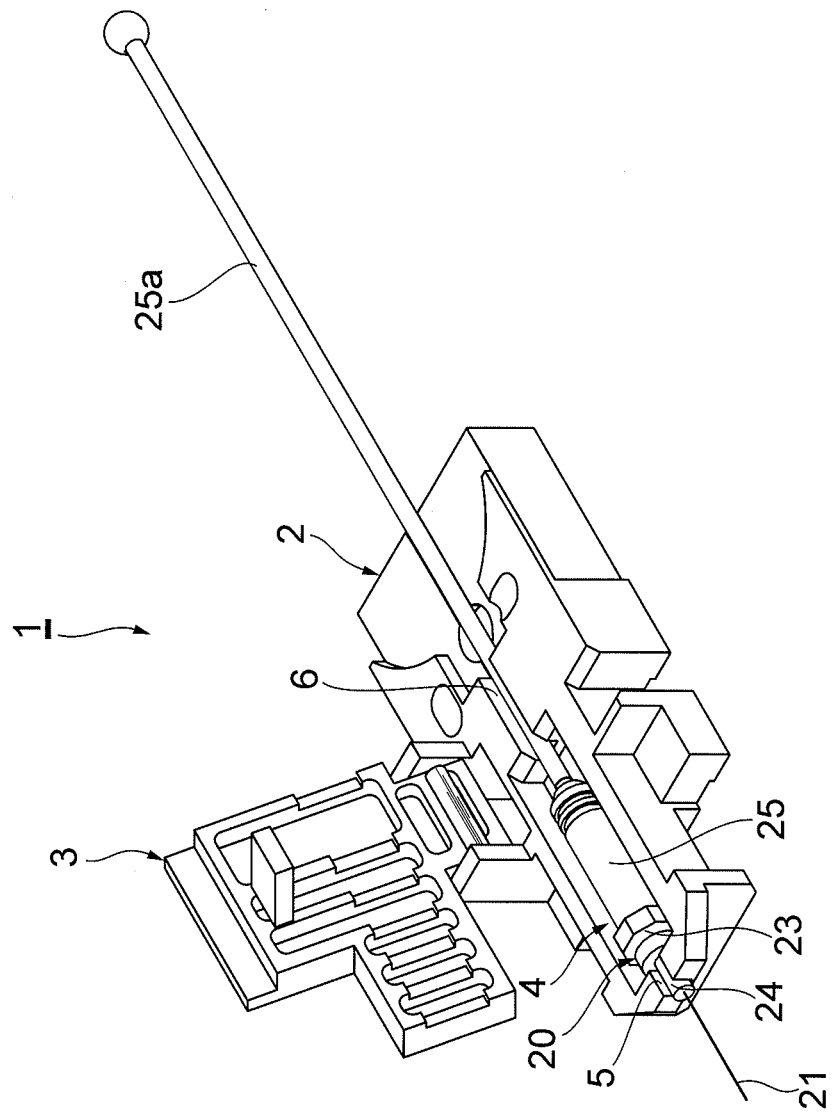
FIG. 6 is a perspective view showing a state in which the ferrule member is mounted on the ferrule holder.

FIG. 6 is a perspective view showing a state in which the ferrule member (SC connector) is mounted on the ferrule holder. As shown in the same drawing, the ferrule member 20 is mounted on the main body 2 so that the built-in fiber 21 projects to the outside of the ferrule holder 1. More specifically, the ferrule member 20 is mounted on the ferrule holder 1 in such a manner that the tubular portion 24 is placed in the first groove 5, the flange portion 23 and the ferrule body 22 (dust cap 25) are placed on the mount portion 4, and the string 25a of the dust cap 25 is placed in the second groove 6.

Figure 7:
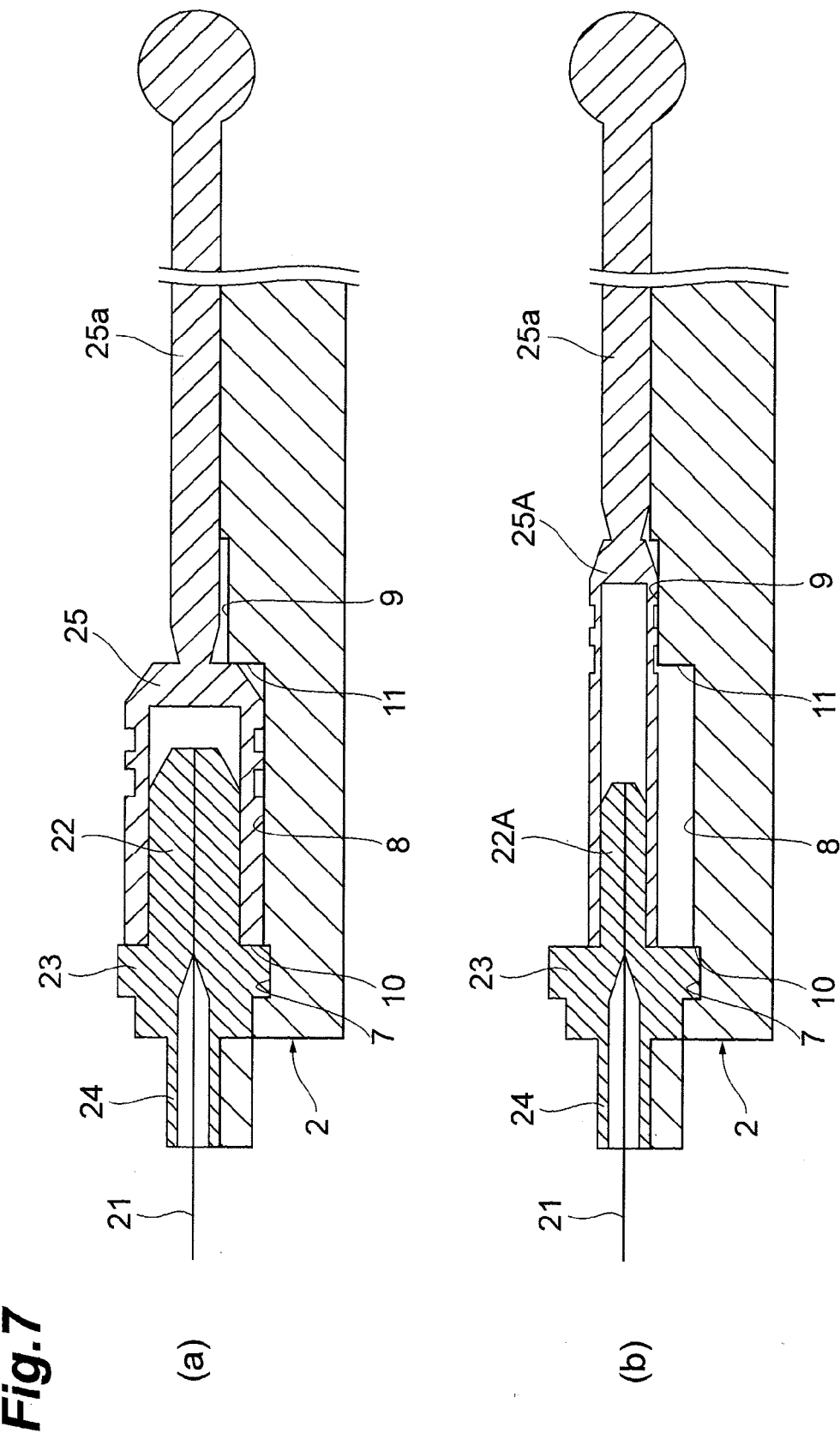
FIG. 7 is cross-sectional views showing enlarged parts of states in each of which the ferrule member is mounted on the ferrule holder.

FIG. 7 is sectional views showing enlarged parts of states in each of which the ferrule member is mounted on the ferrule holder. For example, in the case of the SC connector, as shown in FIG. 7 (a), the flange portion 23 is in contact with the flange mount surface 7 and the dust cap 25 on the ferrule body 22 is in contact with the first mount surface 8. Furthermore, in the case of the LC connector, as shown in FIG. 7 (b), the flange portion 23 is in contact with the flange mount surface 7 and the dust cap 25A on the ferrule body 22A is in contact with the second mount surface 9. In this manner, the ferrule holder 1 is adaptable to various connectors.

Figure 8:
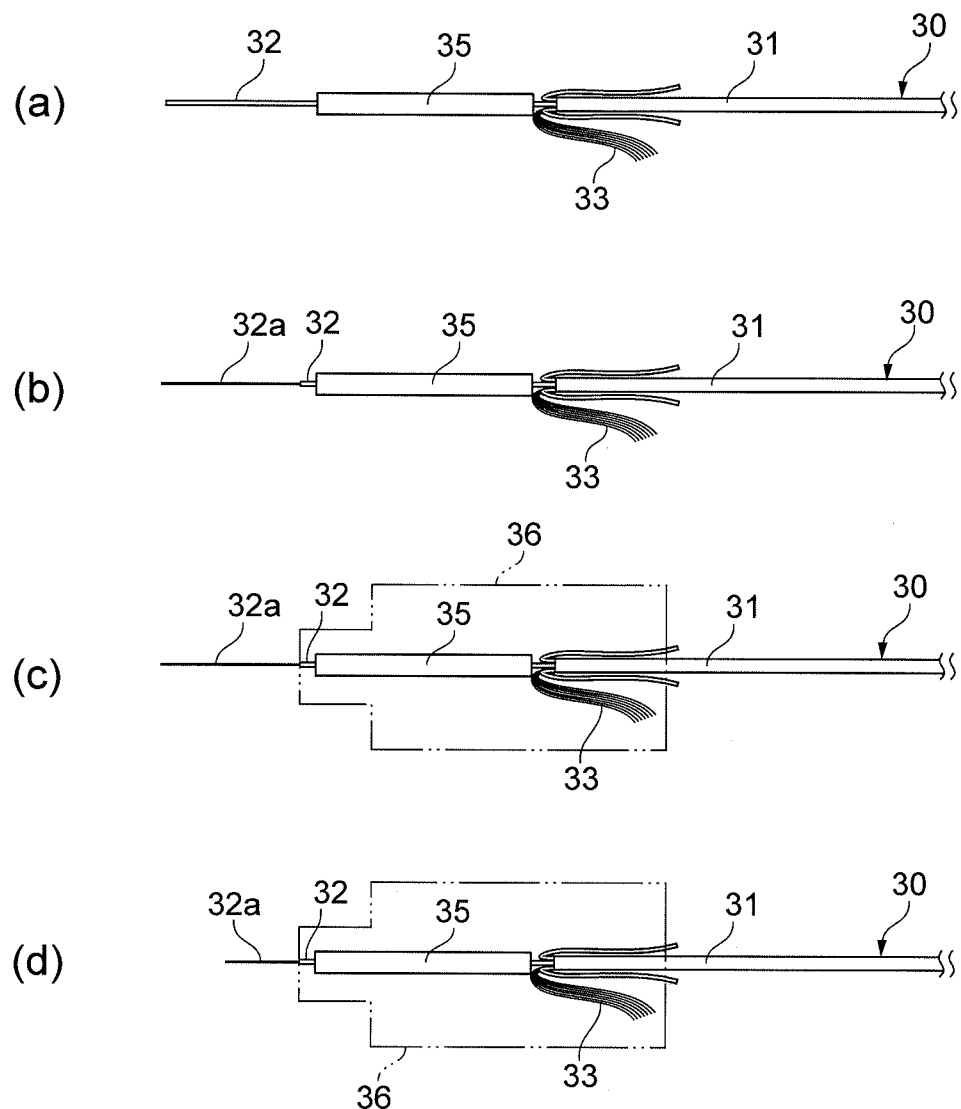
FIG. 8 is a drawing for explaining a procedure of a fusion splice between a built-in fiber and a bare fiber of a coated optical fiber.

The below will describe a procedure of the fusion splice between the built-in fiber 21 and the bare fiber 32a of the coated optical fiber 32 using the above-described ferrule holder 1. First, as shown in FIG. 8 (a), a jacket 31 in the leading end portion of the optical cord 30 is removed to expose the coated optical fiber 32 and strength yarn 33, and an excessive length of strength yarn 33 is cut off. Subsequently, the leading end portion of the jacket 31 is torn into a bifurcate state, the bifurcate jacket 31 and strength yarn 33 are folded back, and the coated optical fiber 32 is slipped into a fusion protection sleeve 35.

Then, as shown in FIG. 8 (b), the coating is removed from the leading end portion of the coated optical fiber 32 to expose the bare fiber 32a, followed by cleaning. Thereafter, as shown in FIG. 8 (c), the leading end portion of the optical cord 30 is set in a fiber holder 36 for fusion. Next, as shown in FIG. 8 (d), the leading end of the bare fiber 32a is cut off. Thereafter, the fiber holder 36 for fusion is set on a fusion splicer.

On the other hand, as shown in FIG. 6, the ferrule member 20 with the dust cap 25 thereon is set in the ferrule holder 1 and then the ferrule holder 1 is set on the fusion splicer. Thereafter, the fusion splicer is operated to implement the fusion splice between the tip of the built-in fiber 21 and the tip of the bare fiber 32a of the coated optical fiber 32. Then, as shown in FIG. 9 (a), the resultant product set in the fiber holder 36 for fusion and the ferrule holder 1 is taken out of the fusion splicer. Next, as shown in FIG. 9 (b), the fusion protection sleeve 35 is moved to the position of fusion-spliced portion S between the built-in fiber 21 and the coated optical fiber 32 and in that state the fusion protection sleeve 35 is heated to contract. This prevents the fusion protection sleeve 35 from deviating from the position of fusion-spliced portion S. As described above, the built-in fiber 21 and the bare fiber 32a become spliced by the fusion splice.

In the ferrule holder 1 of the present embodiment, as described above, the mount portion 4 for the ferrule body 22 to be mounted thereon is provided with the first mount surface 8 and the second mount surface 9 provided through the step portion 11 on the rear side of the first mount surface 8. For example, the ferrule body 22 of the SC connector is larger in outside diameter than the LC connector, while the ferrule body 22A of the LC connector is smaller in outside diameter than the ferrule body 22 of the SC connector. The dust cap 25A to be put on the ferrule body 22A of the LC connector has the length larger than that of the dust cap 25 to be put on the ferrule body 22 of the SC connector. Therefore, for example, in the fusion splice in the case of the SC connector, the ferrule body 22 with the dust cap 25 thereon is mounted on the first mount surface 8; in the fusion splice in the case of the LC connector, the ferrule body 22A with the dust cap 25A thereon is mounted on the second mount surface 9. This allows one ferrule holder 1 to adapt to various connectors. Therefore, there is no need for preparing a plurality of ferrule holders according to types of connectors, which can improve convenience in the fusion splice between the built-in fiber 21 and the bare fiber 32a of the coated optical fiber 32.

Furthermore, the main body 2 is provided with the first groove 5 in which the tubular portion 24 of the ferrule member 20 is to be mounted. This facilitates positioning of the tubular portion 24 when the ferrule member 20 is set on the main body 2. As a result, the ferrule member 20 can be readily set on the ferrule holder 1.

Furthermore, the main body 2 is provided with the second groove 6 in which the string 25a of the dust cap 25 is to be mounted. The string 25a of the dust cap 25 is comprised of a soft material, e.g., rubber, and has the long length for easier handling; therefore, it is difficult for the string 25a to be held in a certain form. Then the string 25a is mounted in the second groove 6 when the ferrule member 20 is set on the ferrule holder 1; this allows the string 25a to be housed therein. As a result, the string 25a can be prevented from being a hindrance during execution of the fusion splice.

The present invention is by no means limited to the above embodiment. For example, the above embodiment showed the example of the ferrule holder 1 adapted to the SC connector and the LC connector, but the ferrule holder 1 can also be applicable, for example, to FC, ST, and MU connectors.

The above embodiment used the magnets M as the fixing means, but the fixing means does not have to be limited to the magnets M and can be any means capable of fixing the ferrule holder 1 to the fusion splicer.

LIST OF REFERENCE SIGNS 1 ferrule holder; 2 main body; 3 lid; 4 mount portion; 5 first groove; 6 second groove; 8 first mount surface; 9 second mount surface; 11 second step portion (step portion); 20 ferrule member; 21 built-in fiber; 22 or 22A ferrule body; 23 flange portion; 24 tubular portion; 25 or 25A dust cap (cap); 25a string; 32a bare fiber (optical fiber); M magnets (fixing means).

The invention claimed is:

1. A ferrule holder to be mounted on a fusion splicer while holding a ferrule member, in execution of a fusion splice between a built-in fiber held by a ferrule body in the ferrule member and an optical fiber of an optical cord, the ferrule body being covered with a cap that completely covers the ferrule body and is attached to a string at a tip of the cap, the ferrule holder comprising:
   a main body configured to house the ferrule body and a flange portion fixed to the ferrule body, and having a mount portion on which the cap covering the ferrule body is to be mounted; and
   a lid arranged so as to be freely opened and closed with respect to the main body and configured to hold the cap covering the ferrule body between the lid and the main body,
   wherein the mount portion has a first mount surface, and a second mount surface provided on a rear side of the first mount surface,
   wherein between the first mount surface and the second mount surface there is a step portion provided so as to make the second mount surface higher than the first mount surface,
   wherein an outside diameter and a length of the cap covering the ferrule body differ, depending on a type of ferrule member to be fusion spliced, and
   wherein the cap is held either by the first mount surface and the lid, or the second mount surface and the lid, depending on the outside diameter and the length of the cap.

2. The ferrule holder according to claim 1,
   wherein the ferrule member has a tubular portion fixed to the flange portion so as to hold the built-in fiber on a rear side of the ferrule body, and
   wherein the main body is provided with a first groove for the tubular portion to be mounted therein, on a front side of the first mount surface.

3. The ferrule holder according to claim 1,
   wherein the ferrule body is covered by a cap which covers the entire ferrule body and to a tip of which a string is coupled, and
   wherein the main body is provided with a second groove for the string to be mounted therein, on a rear side of the second mount surface.

4. The ferrule holder according to claim 1, wherein fixing means for fixing the main body to the fusion splicer is provided on a back surface of the main body.

5. A method for using a ferrule holder to be mounted on a fusion splicer while holding a ferrule member, in execution of a fusion splice between a built-in fiber held by a ferrule body in the ferrule member and an optical fiber of an optical cord, the ferrule body being covered with a cap that completely covers the ferrule body and is attached to a string at a tip of the cap, the ferrule holder comprising:
   a main body configured to house the ferrule body and a flange portion fixed to the ferrule body, and having a mount portion on which the cap covering the ferrule body is to be mounted; and
   a lid arranged so as to be freely opened and closed with respect to the main body and configured to hold the cap covering the ferrule body between the lid and the main body,
   wherein the mount portion has a first mount surface, and a second mount surface provided on a rear side of the first mount surface,
   wherein between the first mount surface and the second mount surface there is a step portion provided so as to make the second mount surface higher than the first mount surface and,
   wherein an outside diameter and a length of the cap covering the ferrule body differ, depending on a type of ferrule member to be fusion spliced, and
   wherein the cap is held either by the first mount surface and the lid, or the second mount surface and the lid, pending on the outside diameter and the length of the cap.

* * * * *